Oct. 25, 1927.
H. E. ELROD
1,646,478
SEWAGE PURIFYING DEVICE
Filed June 10, 1926  3 Sheets-Sheet 2
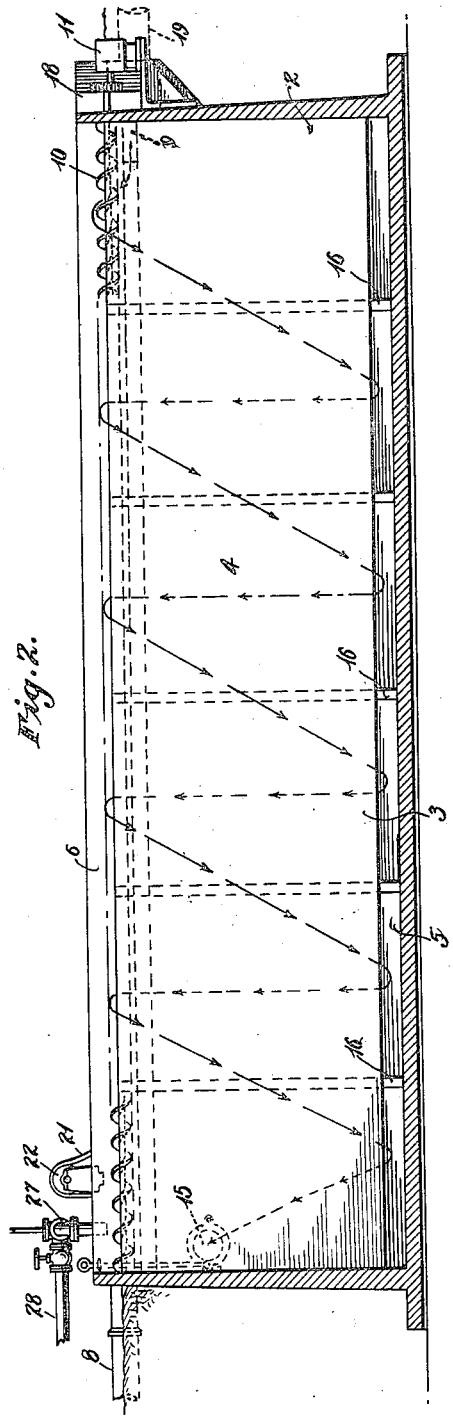
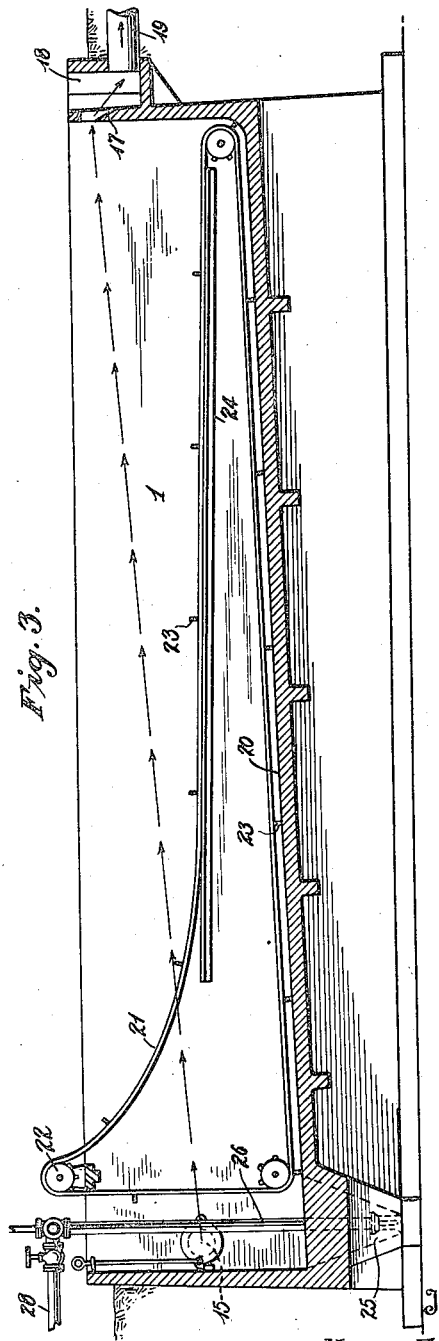
Inventor
Henry E. Elrod
By *Knight Bros.*
Attorneys

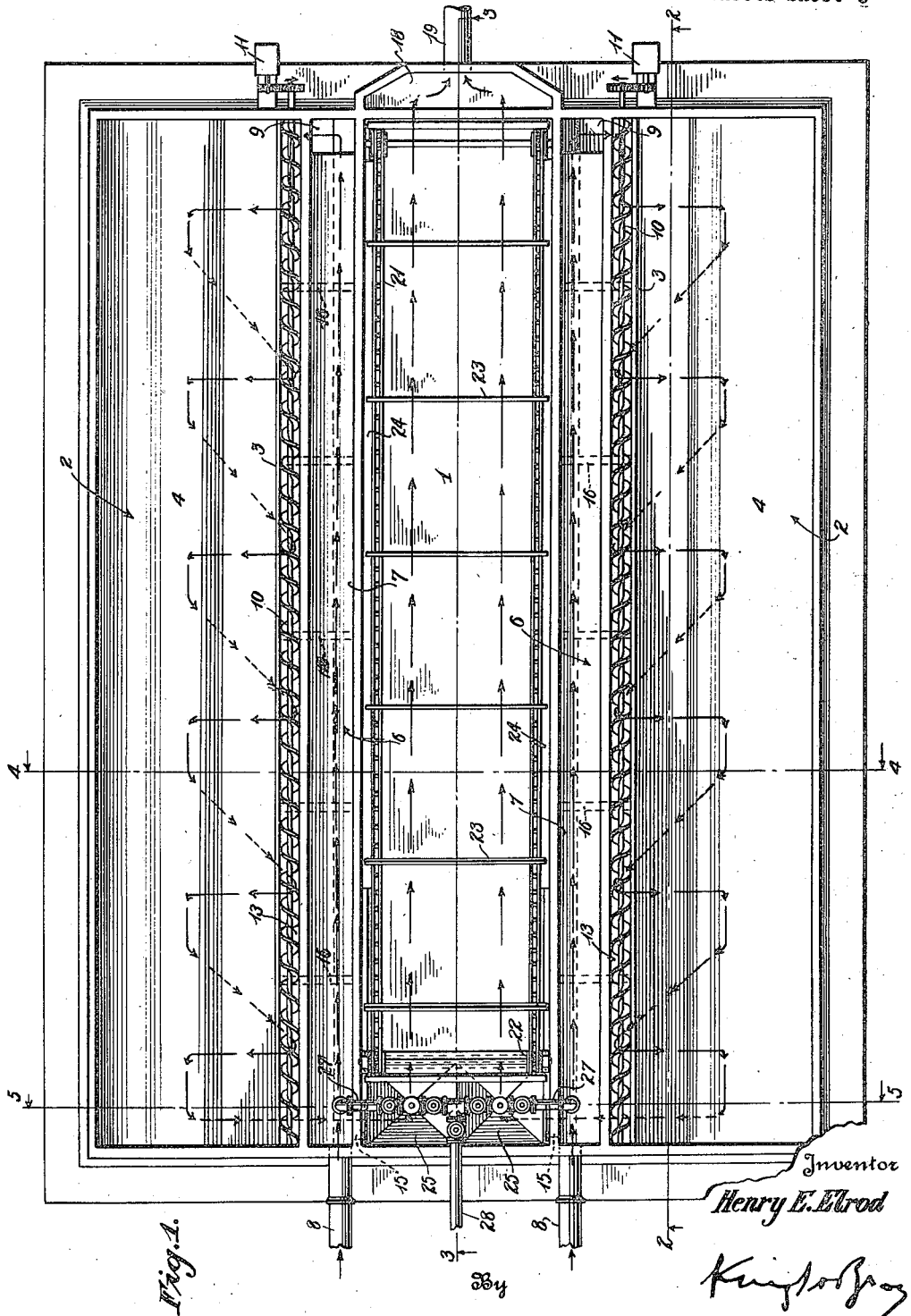

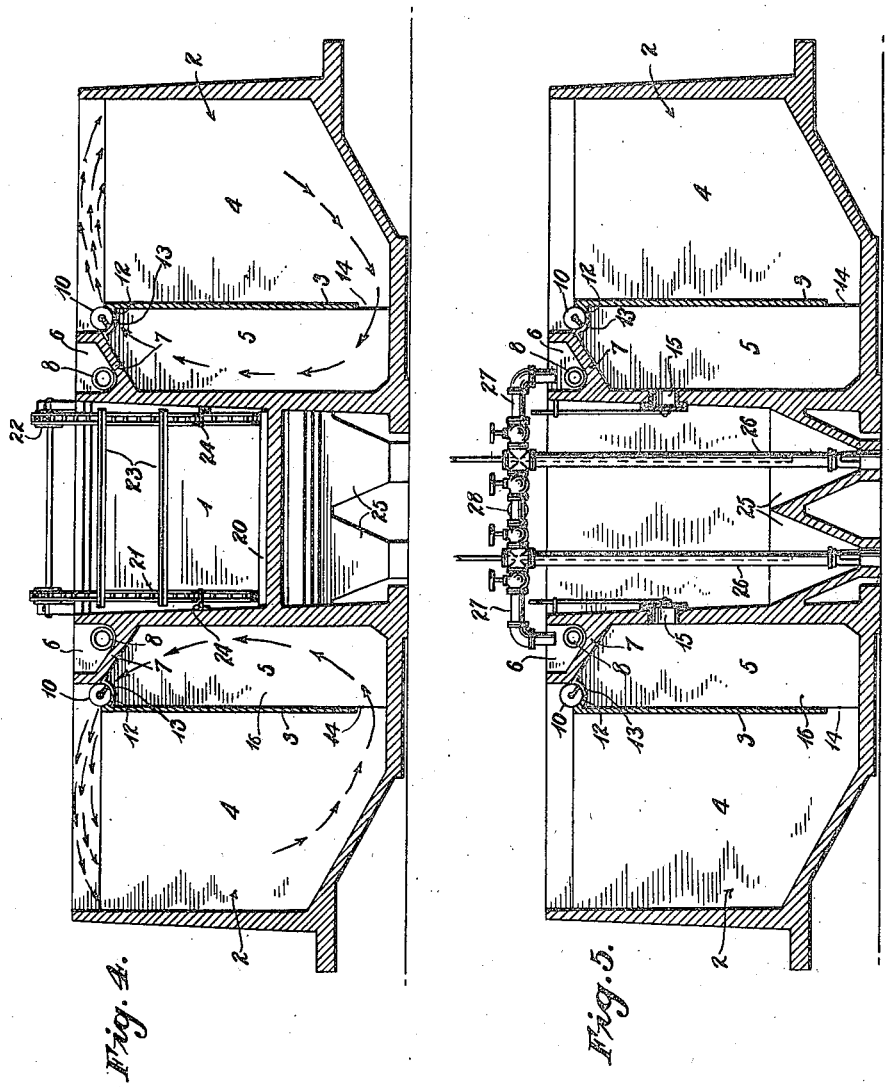

Patented Oct. 25, 1927.

1,646,478

UNITED STATES PATENT OFFICE.

HENRY E. ELROD, OF SANTA MONICA, CALIFORNIA.

SEWAGE-PURIFYING DEVICE.

Application filed June 10, 1926. Serial No. 115,086.

This invention relates to sewage purifying devices and particularly to the kind in which the sewage is purified by bacterial action. It has been proposed to treat sewage in a chamber which has means for raising the sludge falling to the bottom of the chamber, and throwing it through the air in a spray which falls on the surface of the sewage in the chamber. The sludge is very similar to a sponge, and as it passes through the air it absorbs oxygen which the bacteria require for their physiological processes. In this way the bacteria are kept in an active condition as the sludge sinks down through the sewage, carrying with it the solid matter with which it comes in contact.

In the apparatus which has previously been used for carrying out this process the sludge has been raised through a tube situated in the center of the chamber and thrown out in all directions. The clear sewage is then decanted around the edges or in the corners of the chamber. A disadvantage of this arrangement is that fresh sewage is continually mixed with the treated sewage, and the sewage passing out of the chamber has not all been subjected to sufficient treatment. One object of the present invention is to overcome the above mentioned disadvantage by using a long chamber, the sewage being introduced at one end of the chamber and flowing out at the other end. The chamber is divided longitudinally into two compartments by a vertical partition, one of which compartments is preferably much narrower than the other. The sludge and sewage are continually raised in one compartment and thrown in sheets through the air over into the other compartment. The sheets of sludge and sewage land upon the whole surface of the sewage in the other compartment, so that as the sludge sinks it covers every square inch of cross-section of the compartment, and carries down with it all the solid matter in suspension. The bacteria in the sludge are thereby brought into intimate contact with the solid matter, and act upon it vigorously, owing to the oxygen which the sludge has absorbed in its passage through the air.

A further feature of the invention lies in the means used for throwing the sludge and sewage from the one compartment over into the other. This consists in a screw which is rotated in such a direction that it throws the sludge back toward the inlet end of the chamber, and thereby retards its movement toward the outlet.

In sewage purifying tanks there is a tendency for the sewage to form fixed channels through which it passes rapidly from the influent to the effluent end. This "short circuiting" is prevented according to the present invention by placing transverse baffles at suitable intervals along the chamber.

A final settling basin is used in connection with the aeration chamber in which any solid matter passing through the outlet of the aeration chamber is permitted to sink to the bottom, from which it is scraped to one end of the basin. A part of the sediment collected in this way is returned to the inlet end of the aeration chamber and again passed through the system. The rest may be dried naturally or mechanically; or it may be discharged into a separate sludge digestion chamber and disposed of, in large part, by anaerobic action, along with the septic sludge from the pre-settling chamber mentioned in my process Patent No. 1,439,406.

The invention is illustrated by way of example in the accompanying drawings in which, Fig. 1 is a plan view of the apparatus, Fig. 2 is a longitudinal section on the line 2—2 of Fig. 1, Fig. 3 is a longitudinal section on the line 3—3 of Fig. 1, Fig. 4 is a transverse section on the line 4—4 of Fig. 1, and Fig. 5 is a transverse section on the line 5—5 of Fig. 1.

Referring to the drawings in detail, it will be seen that the apparatus there shown by way of example comprises a long tank divided longitudinally into three compartments, a central final settling basin 1, and two outer aeration chambers 2, 2. The two aeration chambers are exactly alike except that their parts are in reversed positions. A description of one will therefore suffice for both.

Each aeration chamber is divided longitudinally by a baffle 3 into a wide compartment 4 and a narrow compartment 5. An influent channel 6 is formed over the narrow compartment by the trough 7. Sewage enters the influent channel through pipe 8, and after flowing the length of the tank enters the chamber 5 through opening 9.

Between the trough 7 and the top of baffle 3 is mounted a screw 10 driven by a motor 11. The top of the baffle has an extension 12 which is curved to conform to the outer periphery of the screw. Openings 13 and 14 are left between the extension 12 and trough 7, and between the lower end of baffle 3 and the bottom of chamber 2, respectively.

The sewage level is maintained at about half the height of screw 10. As the screw rotates it throws the sludge and sewage into the air in sheets of spray which land upon the whole surface of the sewage in compartment 4. It is desirable to make compartment 4 very much wider than compartment 5 so that the upward rate of flow in compartment 5 can be made sufficiently rapid to carry up the sludge while the downward flow in compartment 4 remains very slow so that the bacteria are given sufficient time to digest the organic matter with which they come in contact. The bottom of compartment 4 slopes downwardly toward compartment 5 to cause the sludge which settles thereon to move toward opening 14.

At the far end of the tank from opening 9 a shear gate 15 is provided in the partition between chamber 2 and basin 1 through which the semiclear sewage flows into the final settling basin. Transverse baffles 16 extend across compartment 5 at intervals to prevent "short circuit" flow of the sewage directly from opening 9 to shear gate 15.

The sewage in the final settling basin moves slowly toward weir plate 17 over which it flows into the effluent channel 18, thence out through pipe 19. During this flow through the final settling basin the remaining solid matter settles out onto the floor 20 of the basin. A chain 21, driven at slow speed by a sprocket 22, and bearing transverse sludge flights 23, moves slowly over the floor of the basin, scraping before it the sludge which has settled out onto the floor. Angle irons 24 are provided on the walls of the basin for supporting the upper span of the chain.

The sludge is discharged by the chain into sumps 25, where it is withdrawn through sludge eduction pipes 26 which are simple air lifts. Most of the sludge is returned through pipes 27 to influent channels 6, and is again carried through the apparatus. A portion of the sludge is wasted, continuously, through excess sludge waste pipe 28. The waste sludge is dried or further reduced in the manner previously mentioned.

Having described my invention, I claim:

1. In a sewage purifying apparatus, a long chamber, a vertical longitudinal partition dividing said chamber into two compartments, an opening between the bottom of said partition and the bottom of the chamber, an inlet for sewage at one end of said chamber, an outlet at the other end, and means for throwing sludge and sewage from one compartment in a spray over into the other compartment.

2. In a sewage purifying apparatus, a long chamber, a vertical longitudinal partition dividing said chamber into two compartments, an opening between the bottom of said partition and the bottom of the chamber, an inlet for sewage at one end of said chamber, an outlet at the other end, and means for throwing sludge and sewage from one compartment in a spray over into the other compartment along the whole length of the chamber.

3. In a sewage purifying apparatus, a long chamber, a vertical longitudinal partition dividing said chamber into two compartments, an opening between the bottom of said partition and the bottom of the chamber, an inlet for sewage at one end of said chamber, an outlet at the other end, and means for throwing sludge and sewage from one compartment over into the other compartment in a spray which lands on the whole surface of the sewage in the other compartment.

4. In a sewage purifying apparatus, a long chamber, a vertical longitudinal partition dividing said chamber into a wide compartment and a narrow compartment, an opening between the bottom of said partition and the bottom of the chamber, an inlet for sewage at one end of said chamber, an outlet at the other end, and means for throwing sludge and sewage from said narrow compartment over into said broad compartment in the form of a spray.

5. In a sewage purifying apparatus, a long chamber, a vertical longitudinal partition dividing said chamber into two compartments, an opening between the bottom of said partition and the bottom of the chamber, an inlet for sewage at one end of said chamber, an outlet at the other end, and means for throwing sludge and sewage from one compartment into the other in a direction inclined toward the influent end of the chamber.

6. Sewage purifying apparatus according to claim 1 in which the means for throwing sludge and sewage from one compartment into the other comprises a rotating screw extending along the top of the partition.

7. Sewage purifying apparatus according to claim 1 in combination with transverse baffles arranged at intervals along the chamber.

8. Sewage purifying apparatus according to claim 4 in combination with transverse baffles arranged at intervals across said narrow compartment.

In testimony whereof the foregoing specification is signed.

HENRY E. ELROD.